United States Patent [19]

Stippler et al.

[11] Patent Number: 5,778,762
[45] Date of Patent: Jul. 14, 1998

[54] LAUTER TUN

[75] Inventors: Kurt Stippler, Marzling; Klaus-Karl Wasmuht, Ellingen, both of Germany

[73] Assignee: Anton Steinecker Maschinenfabrik GmbH, Freising-Attaching, Germany

[21] Appl. No.: 739,677

[22] Filed: Oct. 29, 1996

[30] Foreign Application Priority Data

Oct. 30, 1995 [DE] Germany .............. 295 17 345.9

[51] Int. Cl.$^6$ .................................................. C12C 7/16
[52] U.S. Cl. .................................... 99/276; 99/277
[58] Field of Search ................. 99/276, 277, 277.1, 99/277.2

[56] References Cited

U.S. PATENT DOCUMENTS 4,494,451 1/1985 Hickey .................. 99/276

FOREIGN PATENT DOCUMENTS 2144449 3/1985 United Kingdom ............. 99/276

*Primary Examiner*—Reginald L. Alexander
*Attorney, Agent, or Firm*—Seed and Berry LLP

[57] ABSTRACT

A lauter tun comprising a plurality of lauter pipes which are arranged with their openings in the bottom portion of the lauter tun in evenly distributed fashion over the bottom surface, which end in a collecting vessel positioned at a lower level than the bottom of the lauter tun and are led therefrom to a buffer vessel the level of which is controlled and which is connected via a compensating duct to the air chamber of the lauter tun. All of the lauter pipes end in a joint chamber of the collecting vessel which is connected via a single connection duct to the buffer vessel.

5 Claims, 1 Drawing Sheet

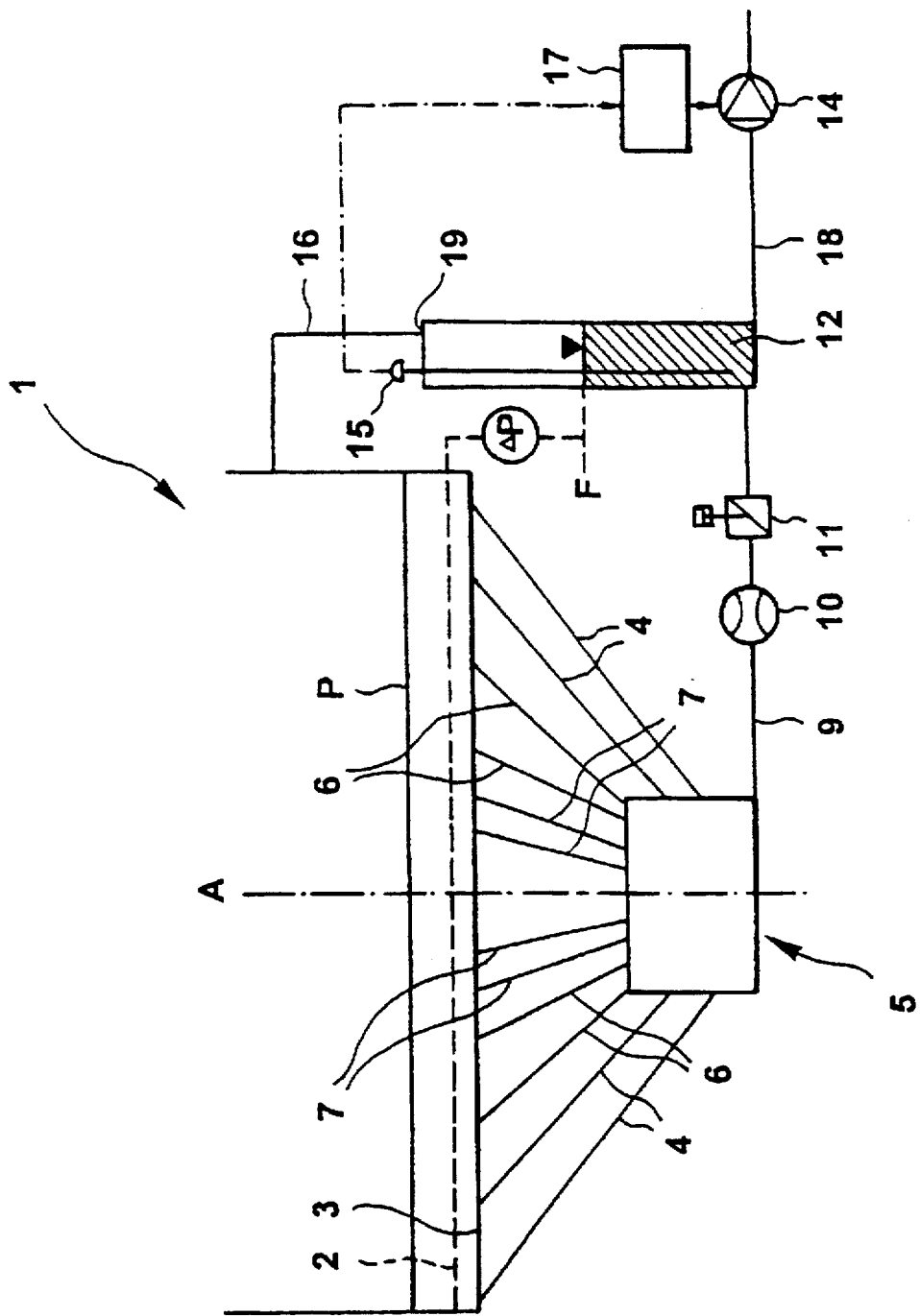

LAUTER TUN

TECHNICAL FIELD

The present invention relates to a lauter tun for brewing, the tun comprising a plurality of lauter pipes which are arranged with their openings in the bottom portion of the lauter tun in evenly distributed fashion over the bottom surface and end in a collecting vessel located at a lower level than the bottom of the lauter tun, and are led therefrom to a buffer vessel the level of which is controlled and which is connected via a compensating duct to the air chamber of the lauter tun.

BACKGROUND OF THE INVENTION

Especially with large lauter tuns, it is known that in the lautering process wort is discharged from various areas, for instance from inner swell areas and from outer swell areas, into separate compartments or chambers of a collecting vessel. Hence, with a view to achieving uniform lautering from all of the swell areas, attention can be paid to the fact that on account of the larger circumference of the lauter tun in the outer swell areas more liquid flows quantitatively off from said areas than from the inner swell areas.

It is known in the prior art (cf., e.g., Steinecker brochure "Läutertechnik 2/95" ("Lautering Technology 2/95") that the wort collecting in the individual chambers of the collecting vessel is passed on via ducts having different diameters to a wort collecting duct which leads to a buffer vessel. In the buffer vessel, which communicates via a compensating duct with the air chamber of the lauter tun, the liquid level is set to have a specific value by removing either more or less wort from the buffer vessel by means of a pump. Since the individual ducts from the collecting vessel end with different cross-sections in the collecting duct leading to the buffer vessel, it may happen that a suction effect, i.e. a vacuum, is produced in the pipes and thus ducts having a smaller diameter because of the quantitatively larger liquid throughput from the pipes having a larger diameter, which might form bubbles in the wort that are not desired.

SUMMARY OF THE INVENTION

It is the object of the present invention to provide a lauter tun of the above-mentioned type in which the formation of bubbles can reliably be prevented in the outflowing wort during lautering by taking simple constructional measures.

This object is achieved in that all lauter pipes end in a joint chamber of the collecting vessel and that said chamber is connected via a single connection duct to the buffer vessel.

Since all of the lauter pipes end in a joint collecting vessel and since only one connection pipe leads from the collecting vessel into the buffer vessel, there prevails a uniform pressure in the collecting vessel. That is why no suction effect takes place and why no undesired bubbles are formed.

Since the collecting vessel is not subdivided and since there is only one connection duct leading from the collecting vessel to the buffer vessel and since there is consequently only one control valve, the construction is considerably simplified and less expensive than known solutions.

In an advantageous development of the invention, the lauter pipes are combined in groups in accordance with their radial distance from the center of the lauter tun. Lauter pipes which are assigned to different groups have different diameters. It is in this manner that different amounts of liquid which must be discharged from swell areas at a different radial distance from the center of the lauter tun can be offset, whereby the same amount of liquid flows from all of the swell areas into the collecting vessel.

In another development of the invention, a rod type probe which measures the level is arranged in the buffer vessel. Depending on the measuring result, a pump may then be controlled to remove the corresponding amounts of wort from the buffer vessel in such a manner that the level is substantially kept constant.

A pressure sensor may sense the level instead of a rod probe.

The buffer vessel is advantageously designed and arranged such that its upper end comes to rest above the false bottom.

This makes it possible to operate with a very small pressure difference during lautering of the first wort, the pressure difference being adjustable in response to the viscosity of the wort.

BRIEF DESCRIPTION OF THE DRAWING

The attached drawing is a schematic representation of a lauter tun in accordance with an exemplary embodiment of the present invention.

DETAILED DESCRIPTION OF THE INVENTION

The invention shall now be explained in more detail hereinafter with reference to an embodiment shown in the drawing.

In the figure, which diagrammatically illustrates the invention, the lauter tun is designated by 1 on the whole. It is only the lower part of the lauter tun that is shown. Reference sign 2 designates a false bottom. As for the basic structure of a lauter tun, reference is made by way of example to the Steinecker brochure 2/95 "Läutertechnik" ("Lautering Technology").

The wort which is located in lauter tun 1 at level P is removed below the false bottom 2 via lauter pipes 4, 6, 7 that end in evenly distributed fashion over the bottom surface 3. All of the lauter pipes are connected to a joint chamber of a collecting vessel 5. This means that the collecting vessel is not additionally subdivided. The collecting vessel is connected via a single duct 9 to a flow meter 10 and via a control valve 11 to a buffer vessel 12. Since the collecting vessel is not subdivided, the pressure prevailing therein is uniform. Hence, no partial vacuum is formed that would degas the wort. To take into account the different amounts of fluid that flow from different swell areas of the lauter tun into the collecting vessel, the lauter pipes are equipped with different diameters at a different radial distance from the center of the lauter tun, so that the same amount of liquid flows from all swell areas into the collecting vessel. Hence, the outflowing amount is adapted by suitably selecting the outflow cross-sections of the lauter pipes 4, 6, 7. In the illustrated embodiment, the lauter pipes 4 having the greatest radial distance from axis A of the lauter tun 1 may e.g. have a greater diameter than lauter pipes 6 which are at a smaller radial distance, but have again a greater diameter than lauter pipes 7 that show the smallest distance from axis A of lauter tun 1.

The filling level is measured via a probe 15 in the buffer vessel. Instead of the probe, it is also possible to arrange a pressure sensor (not shown). The signal from probe 15 is supplied to a control means 17. This control means 17 controls pump 14 which then takes wort from buffer vessel 12 such that a specific level is maintained within certain limits.

In the upper portion, buffer vessel 12 is connected via a compensating duct 16 to the air interior of lauter tun 1, so that the system, on the whole, is formed as an open system. Level F is set such that a pressure difference ΔP is adjusted, the greater pressure prevailing at the lauter tun side. The pressure difference can be increased by lowering the level of the liquid in buffer vessel 12, so that the lauter speed, too, can be influenced via the pressure difference through the level in the buffer vessel.

When the first wort is being lautered, use should be made of a pressure difference ΔP that is as small as possible. To operate at such a small pressure difference, the upper end 19 of the buffer vessel 12, which may e.g. have the shape of an elongated pipe, is positioned above the false bottom level 2.

We claim:

1. A lauter tun comprising a plurality of lauter pipes which are arranged with their openings in a bottom portion of said lauter tun in evenly distributed fashion over a bottom surface, which end in a collecting vessel that is located at a lower level than said bottom of said lauter tun, and said collecting vessel being connected to a buffer vessel, and the buffer vessel being connected via a compensating duct to an air chamber of said lauter tun, characterized in that all of said lauter pipes end in a joint chamber of said collecting vessel, and said chamber is connected via a single connecting duct to said buffer vessel.

2. A lauter tun according to claim 1, characterized in that said lauter pipes are combined in groups in accordance with their radial distance from the center of said lauter tun, and said lauter pipes which are assigned to different groups have different diameters.

3. A lauter tun according to any of claim 1 or 2, characterized in that a rod type probe which measures a level (F) of wort in a buffer vessel is arranged in said buffer vessel.

4. A lauter tun according to any of claim 1 or 2, characterized in that a pressure sensor which measures a level in said buffer vessel is arranged in said buffer vessel.

5. A lauter tun according to claim 1, characterized in that said buffer vessel is formed such that its upper end is positioned above said false bottom.

* * * * *